United States Patent Office 3,842,075
Patented Oct. 15, 1974

3,842,075
ETHERS OF THE PREGNANE SERIES
Rinaldo Gardi, Carate Brianza, Milan, and Romano Vitali, Monza, Milan, Italy, assignors to Warner-Lambert Company, Morris Plains, N.J.
No Drawing. Filed Aug. 3, 1973, Ser. No. 385,385
Claims priority, application Italy, Aug. 7, 1972, 27,956/72
Int. Cl. C07c 173/00
U.S. Cl. 260—239.55 D                                                                18 Claims

ABSTRACT OF THE DISCLOSURE

The disclosure provides biologically active disteroidyl ethers having two steroid moieties joined together by an oxygen bridge between the carbon atoms and the 21- and 3-positions of the two steroid nuclei. These new compounds are prepared by trans-etherification of a 21-hydroxy steroid of the pregnane series with an activated derivative of a 3-ketosteroid of the androstane or pregnane series as well as a 18-homo or a 19-nor-derivative thereof. The disclosure also provides disteroidyl acetals having the 17- and 21-positions of a steroid moiety linked to the 3-position of the other steroid moiety by an acetal bridge, which compounds are obtained by trans-etherification of a 17,21-dihydroxy steroid of the pregnane series with an activated derivative of a 3-ketosteroid of the androstane or pregnane series. The trans-etherification reaction is carried out under anhydrous conditions, in a boiling organic solvent and in the presence of an acid catalyst.

SUMMARY OF THE INVENTION

The present invention relates to a new class of biologically active disteroidyl ethers and acetals of the pregnane series and processes for their preparation.

The new disteroidyl ethers of the invention consist of two steroid nuclei St and St' joined together by an oxygen bridge which involves, respectively, the carbon atoms in the 21- and 3-position of the two nuclei, according to the partial structure:

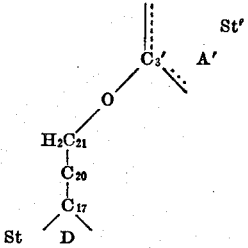

wherein the broken line indicates the presence of a double bond between the carbon atoms 2' and 3' or 3' and 4' in steroid St'.

The steroid nuclei St whose carbon atom in position 21 of the ring D is linked to the oxygen bridge belongs to the pregnane series; the steroid nucleus St' whose carbon atom in position 3' of the ring A' is linked to the oxygen bridge may belong to the androstane or pregnane series, as well as to their 18-homo and 19-nor derivatives.

The new disteroidyl acetals of the pregnane series which represent a further object of this invention consist of two steroid moieties joined together by an acetal bridge which links the carbon atoms in the 17- and 21-positions of a steroid moiety of the pregnane series with the 3'-carbon atom of the other steroid moiety belonging to the androstane or pregnane series.

The process by which the new disteroidyl ethers and acetals of this invention are prepared consists in submitting, under appropriate conditions, a 21-hydroxy steroid or a 17,21-dihydroxy steroid of the pregnane series to trans-etherification with an activated derivative of a 3-ketosteroid of the androstane or pregnane series, as well as their 18-homo and 19-nor derivatives.

More particularly, the scope of the present invention includes new disteroidyl compound belonging to the structural formula I below, and their preparation:

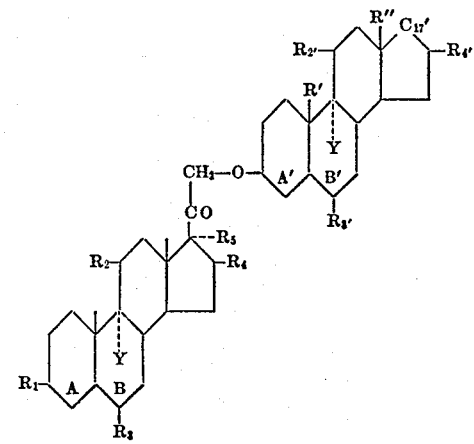

wherein $R_1$ represents a ketonic oxygen or a β-hydroxy group, free or esterified with an hydrocarbon carboxylic acid radical containing up to 8 carbon atoms;
$R'$ represents hydrogen or methyl;
$R''$ represents methyl or ethyl;
$R_2$ represents hydrogen, a ketonic oxygen, a β-hydroxy group optionally esterified with a lower alkanoic acid or a chlorine atom when also Y represents a chlorine;
$R_{2'}$ represents hydrogen, a ketonic oxygen, a β-methyl group, a β-hydroxy group optionally esterified with a lower alkanoic acid or a chlorine atom when also Y' represents a chlorine;
$R_3$ and $R_{3'}$, each represents hydrogen, a methyl group or a halogen atom, preferably chlorine or fluorine;
$R_4$ and $R_{4'}$, each represents hydrogen, a hydroxy group free or esterified with a lower alkanoic acid, an α- or β-methyl group or a methylene radical;
$R_5$ represents hydrogen, a hydroxy group or an acyloxy group containing up to 8 carbon atoms;
Y and Y', each represents hydrogen or a halogen atom, preferably chlorine or fluorine;
$C_{17}$ represents one of the following groupings:

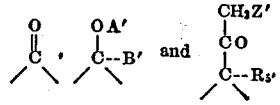

wherein A' represents hydrogen or an acyl radical containing up to 8 carbon atoms;
B' represents hydrogen or a saturated on unsaturated alkyl radical containing up to 4 carbon atoms, for example a methyl, ethyl, propyl, isopropyl, vinyl, ethynyl, propynyl radical or the like;
Z' represents hydrogen, a hydroxy group or an acyloxy radical containing up to 8 carbon atoms;
$R_{5'}$ represents hydrogen, a hydroxy group or an acyloxy group containing up to 8 carbon atoms;
and wherein $R_4$ and $R_5$ or $R_{4'}$ and $R_{5'}$ may form together an isopropylidenedioxy radical of the structure

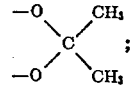

and the hydrogen atom in position 5 or 5', if present, may have the α- or β-configuration.

In the compounds of the above formula, the rings A and B may be saturated or may have one unsaturated bond between the carbon atoms 1:2, 4:5 or 5:6 positions, or two unsaturated bonds between the carbon atoms in 1:2 and 4:5 positions, while the rings A' and B' have, according to the structure of the reacting 3-ketosteroid, one of the following structures:

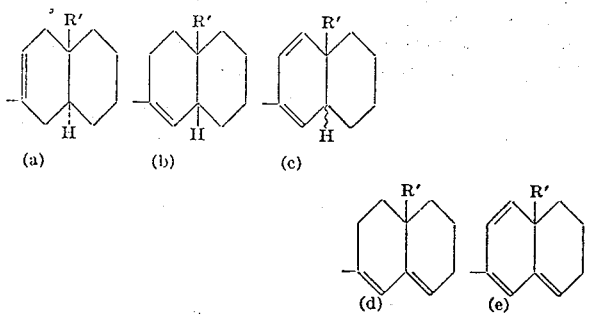

The compounds of formula I may carry, besides the above mentioned substituents, other substituents such as keto group in position 6, a methyl radical in positions 1 and 1', thio-acyl groups in positions 1' and 7', free or esterified α-hydroxy groups or α- or β-halogen atoms in positions 16 and 16', and, further, a methylene bridge may be present in positions 1:2 and 1':2'. There are also included in the scope of the invention 17'-spirolactones of the compounds of formula I; those of particular interest are compounds wherein the 3-ketosteroid moiety is represented by a 17-spirolactone of a 7-acyl substituted compound, particularly by the 17-spirolactone of 3-keto-7α-acetylthioandrost-4-ene, as well as by the 19-nor analog thereof.

The scope of the invention also includes those disteroidyl compounds wherein the 3-ketosteroid moiety is represented by aldosterone, isoaldosterone and their derivatives.

An additional feature of the invention is represented by new disteroidyl acetals belonging to the structural formula II below, and their preparation:

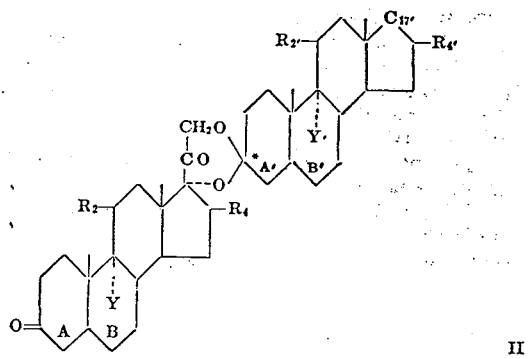

wherein $R_2$, $R_{2'}$, $R_4$, $R_{4'}$, $Y$, $Y'$ and $C_{17'}$ have the above stated meaning. The rings A and B may show an unsaturated bond between the carbon atoms in position 1:2 or 4:5; or two unsaturated bonds between the carbon atoms in positions 1:2 and 4:5. The carbon atom in position 3' forms a new asymmetric center in the disteroidyl ketal molecule. The rings A' and B', accordingly to the structure of the reacting 3-keto-steroid, may have one of the following structures:

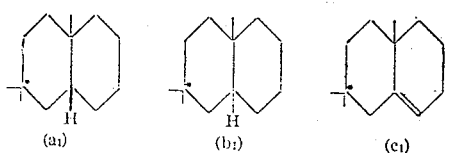

The acyloxy and acryl radicals which are present in the disteroidyl compounds of this invention are preferably derived from organic carboxylic acids containing up to 8 carbon atoms. These acids may be saturated or unsaturated mono- or dicarboxylic acids, including aromatic acids, and may contain a straight or branched aliphatic chain or may have a cycloaliphatic, arylaliphatic or aromatic radical which may also be substituted. Examples of esters include the acetates, propionates, butyrates, valerate, oenanthates, caproates and their isomers, the trimethylacetates, aminoacetates, cyclopentylacetates, β-chloropropionates, cyclopentylpropionates, benzoates and the p-chloro- and p-fluoro-benzoate as well as the hemimalonates, hemisuccinates, hemiglutarates and the salts of these hemiesters with organic or inorganic bases. Esters of polybasic inorganic acids, such as sulphate and phosphates are also of particular interest, since they provide water soluble esters commonly used in the steroid therapy.

The new disteroidyl ethers of formula I according to the present invention can be prepared by reacting, under appropriate conditions, a 21-hydroxysteroid of the pregnane series of the general formula:

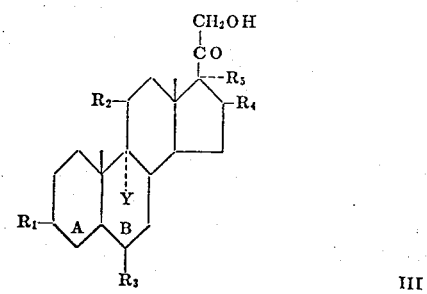

with the enolether or the acetal of a 3-ketosteroid of the androstane or pregnane series as well as of their 18-homo or 19-nor-derivatives of the general formula:

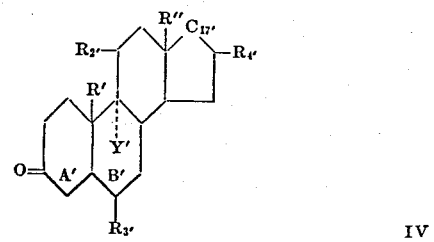

In the compounds of formula III the rings A and B and the substituents $R_1$, $R_2$, $R_3$, $R_4$, $R_5$ and Y have the above stated meaning, with exception that the hydroxyl groups, if present in 16- and 17-positions, are protected, preferably under the form of an ester.

In the compounds of formula IV the ring A' and B' may be saturated of the 5α-or 5β-series, or may contain a $\Delta^1$, $\Delta^4$ or $\Delta^{1,4}$ unsaturated structure. The substituents R', R'', $R_{2'}$, $R_{3'}$, $R_{4'}$ and Y' and the $C_{17'}$ carbon atom have the meaning and the structure as defined for the formula I above, with the exception that the hydroxyl groups, if present in the 17'β- or 21'-position, are protected, preferably under esterified form.

The new disteroidyl acetals of formula II according to the present invention can be prepared by trans-etherification of a 17,21-dihydroxysteroid of the pregnane series of the formula:

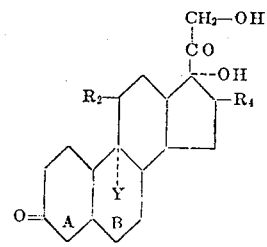

wherein the substituents $R_2$, $R_4$ and Y have the above stated meaning and the rings A and B have the same structure as recited for the formula II above, with the enolether or the acetal of a 3-ketosteroid of the androstane or pregnane series of the formula:

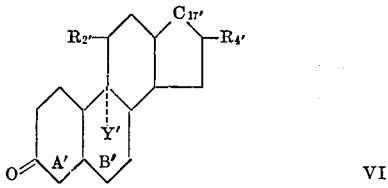

VI wherein the rings A' and B' are saturated or Δ⁴-unsaturated and the hydroxyl groups, if present in the 17'β- or 21'-position, are protected, preferably under esterified form.

The trans-etherification process of this invention is usually carried out under anhydrous conditions, in an appropriate solvent, for example benzene, toluene, xylene, dioxane, dimethylformamide or isooctane, and in the presence of an appropriate acid catalyst, for example p-toluene-sulphonic acid, a naphthalene-sulphonic acid, pyridine p-toluene-sulphonate or pyridine hydrochloride. The reaction is preferably carried out at a temperature above 70° C. for a period from about 30 minutes to about 4 hours.

The resulting disteroidyl compound is then, if desired, hydrolysed or esterified, according to known methods, in order to convert the ester groups in 3, 11 (11'), 16 (16'), 17 (17') or 21'-positions into free hydroxyl groups and/or to convert the compounds with free hydroxyl groups into corresponding esterified derivatives. In this manner are obtained the acyl esters, and particularly the hemicarboxylic acyl esters and the sulphate or phosphate esters of the disteroidyl compounds having a free hydroxy group in the 17'β- or 21'-position.

The process of this invention also includes the possibility of reducing by known procedures the keto group when present in the 17'-position of the androstane moiety to the corresponding 17'-hydroxyl group.

The structure of the rings A' and B' in the disteroidyl ethers of formula I strickly depends from the nature of the reacting 3-ketosteroids. As said above, the rings A' and B' of the 3-ketosteroids of the androstane or pregnane series represented by formula IV may be saturated or may contain two double bonds or a single double bond in the 1:2 and/or 4:5 positions. When the 3-ketosteroid is enolized (as in the corresponding 3-enolether starting material or in the resulting disteroidyl compound), the rings A' and B' assume by effect of the anolization one of the following structure:

(a) 5α,Δ²-ene, when the 3-ketosteroid employed as parent compound is saturated and belongs to the 5α-series;
(b) 5β,Δ³-ene, when the 3-ketosteroid is a saturated compound of the 5β-series;
(c) 5α, or 5β,Δ¹,³-diene, when the 3-ketosteroid is Δ¹-unsaturated of the 5α- or 5β-series;
(d) Δ³,⁵-diene, when the 3-ketosteroid is Δ⁴-unsaturated;
(e) Δ¹,³,⁵-triene, when the 3-ketosteroid is Δ¹,⁴-unsaturated.

The enolethers of 3-ketosteroids which may be employed as starting materials in the process of this invention are in general alkyl or cycloalkyl enolethers containing up to 7 carbon atoms in the alkyl or cycloalkyl group. Preferred enolethers are methyl-, ethyl-, propyl-, butyl-enol ethers and their isomers. When the 3-ketosteroid is reacted in the process of this invention under the form of acetal, the dimethyl- or diethyl acetal are preferably used as as starting materials. All these compounds may be easily prepared according to methods well known in the steroid art.

The 21-hydroxy steroids of formulae III and V—which represent the other starting materials for the preparation of the disteroidyl compounds of this invention—are preferably derived from therapeutically active steroids. Useful starting materials include corticoids and synthetic derivatives thereof, such as corticosterone, 11-dehydrocorticosterone, 11-desoxycorticosterone, 17α-hydroxy-11-desoxycorticosterone, cortisone, hydrocortisone, prednisone, prednisolone, their 9α-fluoro or chloro analogs, their 9α-fluoro, 16α- and 16β-methyl derivatives, such as dexamethasone and betamethasone, their 6α-fluoro or 6α-methyl analogs, such paramethasone and flumethasone, their 16-methylene derivatives and the like. All of these 21-hydroxy compounds are preferably used—for the preparation of disteroidyl ethers of formula I—under the form of the corresponding 17-monoesters which are easily obtainable by acid hydrolysis of steroid 17,21-orthoesters, as disclosed and claimed in our U.S. Pat. No. 3,152,154 and in our U.S. patent application Ser. No. 48,481, filed June 22, 1970.

The disteroidyl ethers and acetals of this invention are biologically active compounds suitable for oral, parenteral or topical administration. The activity of these compounds generally reflects the activity of the individual steroid moieties in the disteroid molecule. Thus, the disteroidyl ethers of general formula I, in which the rings A and B are saturated, the C₁₇' carbon atom has the pregnane structure, the hydrogen atoms at the 5- and 5'-positions have the β-configuration and the symbols R₄, R₄', R₅, R₅' and Z' all represent hydrogen atoms, show a central nervous system (CNS) depressant activity. These compounds are, therefore, useful as sedative, hypnotic or anaesthetic agents.

The disteroidyl ethers of general formula I which contain a 19-nor androstane moiety 17α-alkenyl or alkynyl substituted, are active antifertility agents and can be advantageously used by oral or parenteral route for controlling reproduction in animals.

The disteroidyl ethers and acetals in which the alcoholic moiety (St) has the characteristic structure of the corticoids, possess mineralcorticoid, glucocorticoid and anti-inflammatory properties and can be used for the treatment of inflammatory conditions in animals and humans in the same manner as known corticoids. In general, the corticoid activity of these disteroidyl compounds is of a higher degree than shown by the parent steroids. Additionally, some dissociations of activities are exhibited which make the application of these diseroids particularly interesting. For example, when administered locally, they show a systemic activity (thymolytic or adrenosuppressive) which is relatively low. This represents a remarkable therapeutic advantage in the dermatological treatments of inflammations wherein a depression of the adrenal activity would not be desirable.

In particular, the compounds of Formula I in which the alcoholic moiety has a corticoid structure and the 3-keto-steroid moiety is represented by an androstane or a 19-norandrostane, show an anti-inflammatory activity on topical application which is, in general, many times higher than that displayed by the parent corticosteroids. Representatives of this class of compounds include 11β,17α-dihydroxy-21-(17'β-propionoxyandrosa-3',5'-dien-3'-yloxy)-pregna-1,4-diene-3,20-dione 17-benzoate;
11β,17α-dihydroxy-21-(17'-oxoestra-3',5'-dien-3'-yloxy)-pregna-1,4-diene-3,20-dione 17-benzoate;
9α-fluoro-11β,17α-dihydroxy-21-(17'α-acetoxy-5'α-androsta-1',3'-dien-3'-yloxy)-16β-methylpregna-1,4-diene-3,20-dione;
9α-fluoro-11β,17α-dihydroxy-21-(17'β-propionoxy-5'β-androst-3'-en-3'-yloxy)-16β-methylpregna-1,4-diene-3,20-dione 17-benzoate;
9α-fluoro-11β,17α-dihydroxy-21-(17'-oxoestra-3',5'-dien-3'-yloxy)-16β-methylpregna-1,4-diene-3,20-dione 17-benzoate;
9α-fluoro-11β,17α-dihydroxy-21-(17'β-acetoxyestra-3',5'-dien-3'-yloxy)-16β-methylpregna-1,4-diene-3,20-dione 17-benzoate; and
17α,21-(17'β-hydroxy-5'α-androstane-3',3'-diyloxy)-11β, hydroxypregna-1,4-diene-3,20-dione.

All these compounds have been found to possess an anti-inflammatory activity, upon local administration, from 10 to 40 times as high as that of the corresponding parent corticoid.

In a similar manner, compounds wherein the 3-ketosteroid moiety belongs to the pregnane, 19-norpregnane or 17α-hydroxy pregnane series, such as 9α-fluoro-11β,17α-dihydroxy-21-(20'-oxopregna-3',5'-dien-3'-yloxy)-16β-methylpregna-1,4-diene-3,20-dione 17-benzoate;

9α-fluoro-11β,17α-dihydroxy-21-(20'-oxo-19'-norpregna-3',5'-dien-3'-yloxy)-16β-methylpregna-1,4-diene-3,20-dione 17-benzoate; and 9α-fluoro-11β,17α-dihydroxy-21-(9'α-fluoro-11'β,17'α-dihydroxy-20'-oxo-21'-acetoxy-16'β-methyl-pregna-3',5'-dien-3'-yloxy)-16β-methylpregna-1,4-diene-3,20-dione 17-benzoate, have demonstrated a local anti-inflammatory activity at least 10 times as high as that of the corresponding parent betamethasone.

Certain disteroidyl ethers of this invention also show a more protracted action, when administered in a signal oral dose, in comparison with the parent steroid; such disteroidyl compounds include 11β,17α-dihydroxy-21-(17'β-propionoxyandrosta-3',5'-dien-3'-yloxy)-pregna-1,4-dien-3,20-dione 17-benzoate, and 11β,17α-dihydroxy-21-(17'-oxoestra-3',5'-dien-3'-yloxy)-pregna-1,4-diene-3,20-dione 17-benzoate.

Other compounds of this class display, upon continued administration, a reduced toxicity in comparison to the corresponding parent steroid, as well as a greatly reduced catabolic effect, upon oral or parenteral administration, a clearly superior effect is demonstrated in maintaining adrenalectomized rats alive. Typical examples of this group of compounds are:

9α-fluoro-11β,17α-dihydroxy-21-(17'β-acetoxyestra-3',5'-dien-3'-yloxy)-16β-methylpregna-1,4-diene-3,20-dione 17-benzoate, and 9α-fluoro-11β,17α-dihydroxy-21-(17'-oxoestra-3',5'-dien-3'-yloxy)-16β-methylpregna-1,4-diene-3,20-dione.

The preparation of representative disteroidyl compounds of the present invention is more fully described in the following examples. In order to simplify the description of the chemical preparation of these compounds, the steroid used as starting materials are listed in the following Tables A and B and are marked by a progressive number following the letter A or B. In Table A are listed the 21-hydroxy steroids starting materials and in Table B are listed the enolethers or acetals of the 3-ketosteroids used.

TABLE A $A_1$: 9α-fluoro-11β,17α,21-trihydroxy-16β-methyl-pregna-1,4-diene-3,20-dione 17-benzoate
$A_2$: 11β,17α,21-trihydroxypregna-1,4-diene-3,20-dione 17-benzoate
$A_3$: 21-hydroxypregn-4-ene-3,20-dione
$A_4$: 17α,21-dihydroxypregna-1,4-diene-3,11,20-trione
$A_5$: 17α,21-dihydroxypregna-1,4-diene-3,11,20-trione 17-benzoate
$A_6$: 17α,21-dihydroxypregn-4-ene-3,20-dione 17-benzoate
$A_7$: 11β,17α,21-trihydroxypregna-1,4-diene-3,20-dione 11-acetate
$A_8$: 9α,11β-dichloro-17α,21-dihydroxy-16β-methyl-pregna-1,4-dien-3,20-dione 17-acetate
$A_9$: 21-hydroxy-5α-pregnane-3,20-dione
$A_{10}$: 17α,21-dihydroxypregn-4-ene-3,11,20-trione
$A_{11}$: 17α,21-dihydroxypregn-4-ene-3,20-dione
$A_{12}$: 9α-fluoro-11β,17α,21-trihydroxy-16β-methylpregna-1,4-diene-3,20-dione 11-acetate
$A_{13}$: 9α-fluoro-11β,17α,21-trihydroxy-16α-methylpregna-1,4-diene-3,20-dione 11-acetate
$A_{14}$: 3β,21-dihydroxypregn-5-en-20-one 3-acetate
$A_{15}$: 11β,21-dihydroxypregn-4-en-3,20-dione
$A_{16}$: 21-hydroxypregn-4-en-3,20-dione
$A_{17}$: 21-hydroxypregn-4-en-3,11,20-trione
$A_{18}$: 11β,17α,21-trihydroxypregn-4-en-3,20-dione 17-benzoate
$A_{19}$: 9α,11β-dichloro-17α,21-dihydroxypregna-1,4-diene-3,20-dione 17-benzoate
$A_{20}$: 9α-fluoro-11β,17α,21-trihydroxy-16α-methyl-pregna-1,4-diene-3,20-dione 17-benzoate
$A_{21}$: 9α-fluoro-11β,17α,21-trihydroxy-16-methylene-pregna-1,4-diene-3,20-dione 17-benzoate
$A_{22}$: 6α,9α-difluoro-11β,17α,21-trihydroxypregna-1,4-diene-3,20-dione 17-benzoate
$A_{23}$: 6α,9α-difluoro-17α,21-dihydroxypregna-1,4-diene-3,11,20-trione 17-benzoate
$A_{24}$: 6α-fluoro-21-hydroxy-16α-methylpregna-1,4-diene-3,11,20-trione
$A_{25}$: 6α-fluoro-11β,21-dihydroxy-16α-methylpregna-1,4-diene-3,20-dione
$A_{26}$: 9α-fluoro-17α,21-dihydroxy-16-methylene-pregna-1,4-dien-3,11,20-trione 17-acetate
$A_{27}$: 21-hydroxy-5β-pregnane-3,20-dione
$A_{28}$: 3β,17α,21-trihydroxypregn-5-en-20-one 3,17-dipropionate
$A_{29}$: 9α-fluoro-11β,16α,17α,21-tetrahydroxypregna-1,4-diene-3,20-dione 16,17-diacetate

TABLE B $B_1$: 3-ethoxyestra-3,5-dien-17β-ol acetate
$B_2$: 3-ethoxyestra-3,5-dien-17-one
$B_3$: 1α,3,3-trimethoxy-5α-androstan-17β-ol acetate
$B_4$: 3-ethoxypregna-3,5-dien-20-one
$B_5$: 3-ethoxy-19-norpregna-3,5-dien-20-one
$B_6$: 3,3-dimethoxy-5β-androstan-17β-ol propionate
$B_7$: 3-ethoxyandrosta-3,5-dien-17β-ol propionate
$B_8$: 3-ethoxy-21-hydroxypregna-3,5-dien-20-one acetate
$B_9$: 3-ethoxyestra-3,5-dien-17β-ol propionate
$B_{10}$: 3-ethoxy-19-nor-17α-pregna-3,5-dien-20-yn-17β-ol acetate
$B_{11}$: 3-methoxy-9α-fluoro-11β,17α,21-trihydroxy-16β-methylpregna-3,5-dien-20-one 21-acetate
$B_{12}$: 3,3-dimethoxy-5α-androstan-17β-ol propionate
$B_{13}$: 3,3-dimethoxy-5α-androstan-17β-ol acetate
$B_{14}$: 3-methoxy-9α-fluoro-11β-17α,21-trihydroxy-16β-methylpregna-1,3,5-trien-20-one 21-acetate
$B_{15}$: 3-ethoxy-6α-fluoro-androsta-3,5-dien-17-one
$B_{16}$: 3-ethoxy-7α-acetylthio-androsta-3,5-dien-17-one
$B_{17}$: 3-methoxy-9α-fluoro-11β,16α-dihydroxyandrosta-3,5-dien-17-one 16-propionate
$B_{18}$: 3,3-dimethoxy-9α,16β-difluoro-11β-hydroxyandrost-4-en-17-one
$B_{19}$: 3,3-dimethoxy-5β-pregnan-20-one
$B_{20}$: 3-ethoxy-21-hydroxy-5α-pregn-2-en-20-one acetate
$B_{21}$: 3-ethoxy-21-hydroxy-5α-pregn-2-en-20-one butyrate
$B_{22}$: 3,3-dimethoxy-5β-pregnan-11,20-dione
$B_{23}$: 3-ethoxy-19-nor-17α-pregna-3,5-dien-20-yn-17β-ol valerate
$B_{24}$: 3-ethoxy-13-ethyl-17α-ethynylgona-3,5-dien-17β-ol acetate
$B_{25}$: 3-ethoxy-17α-hydroxy-6-methylpregna-3,5-dien-20-one acetate
$B_{26}$: 3-ethoxyandrosta-3,5-dien-17-one
$B_{27}$: 3-methoxy-6α,9α-difluoro-17α,21-dihydroxy-pregna-1,3,5-triene-11,20-dione 17,21-diacetate
$B_{28}$: 3-methoxy-6α,9α-difluoro-11β,17α-dihydroxy-pregna-1,3,5-triene-20-one 17-propionate
$B_{29}$: 3-methoxy-6α,9α-difluoro-17α-hydroxypregna-1,3,5-triene-11,20-dione propionate
$B_{30}$: 3-ethoxy-17α-pregna-3,5-dien-21,17β-carbolactone
$B_{31}$: 3-ethoxy-7α-mercapto-17α-pregna-3,5-diene-21,17β-carbolactone acetate B₃₂: 3-ethoxy-19-nor-17α-pregna-3,5-diene-21,17β-carbolactone B₃₃: 3-ethoxy-7α-mercapto-19-nor-17α-pregna-3,5-dien-21-17β-carbolactone acetate B₃₄: 3-ethoxy-11β-methyl-19-nor-17α-pregna-3,5-dien-20-yn-17β-ol acetate B₃₅: 3-methoxy-6α-fluoro-21-hydroxy-16α-methylpregna-1,3,5-triene-11,20-dione 21-acetate B₃₆: 3-methoxy-6α-fluoro-11β,21-dihydroxy-16α-methylpregna-1,3,5-trien-20-one 21-acetate B₃₇: 3-ethoxy-19-nor-17α-pregna-3,5-dien-20-yn-17β-ol acetate B₃₈: 3-ethoxy-17α-hydroxypregna-3,5-dien-20-one acetate B₃₉: 1α,3-dimethoxy-17α,21-dihydroxypregna-3,5-diene-11,20-dione 21-acetate B₄₀: 3-ethoxy-6-chloro-17α-hydroxypregna-3,5-dien-20-one acetate B₄₁: 3-ethoxy-17α-methylestra-3,5-dien-17β-ol acetate B₄₂: 3-methoxy-9α-fluoro-17α,21-dihydroxy-16β-methylpregna-1,3,5-triene-11,20-dione 21-acetate B₄₃: 3-ethoxyandrosta-3,5-dien-17β-ol acetate B₄₄: 3,3-dimethoxy-21-hydroxy-5β-pregnan-20-one acetate B₄₅: 3-ethoxy-21-hydroxy-5α-pregn-2-en-20-one acetate B₄₆: 1α,3-dimethoxy-17α,21-dihydroxypregna-3,5-diene-11,20-dione 17,21-diacetate B₄₇: 3,3-dimethoxy-5α-pregnan-20-one B₄₈: 3,3-dimethoxy-5β-pregnan-11,20-dione B₄₉: 3,3-dimethoxy-17α-hydroxy-5β-pregnane-11,20-dione acetate B₅₀: 3-ethoxy-17α,21-dihydroxypregna-3,5-diene-11,20-dione 21-acetate B₅₁: 3-methoxy-11β,17α,21-trihydroxypregna-1,3,5-trien-20-one 21-acetate B₅₂: 3-methoxy-9α,11β-dichloro-17α,21-dihydroxypregna-1,3,5-trien-20-one 21-acetate B₅₃: 3-methoxy-9α,11β-dichloro-17α,21-dihydroxy-16α-methylpregna-1,3,5-trien-20-one 21-acetate B₅₄: 3-methoxy-9α,11β-dichloro-17α,21-dihydroxy-16β-methylpregna-1,3,5-trien-20-one 21-acetate B₅₅: 3-methoxy-9α-fluoro-11β,17α,21-trihydroxy-16α-methylpregna-1,3,5-trien-20-one 21-acetate B₅₆: 3-methoxy-9α-fluoro-17α,21-dihydroxy-16α-methylpregna-1,3,5-triene-11,20-dione 17,21-diacetate B₅₇: 3-methoxy-9α-fluoro-11β,17α,21-trihydroxy-16β-methylpregna-1,3,5-trien-20-one 17,21-diacetate B₅₈: 3-methoxy-9α-fluoro-11β,17α,21-trihydroxy-16-methylenepregna-1,3,5-trien-20-one 21-acetate B₅₉: 3-methoxy-9α-fluoro-17,21-dihydroxy-16-methylenepregna-1,3,5-triene-11,20-dione 17,21-diacetate B₆₀: 3-methoxy-9α-fluoro-16α,17α-isopropylidenedioxy-21-hydroxypregna-1,3,5-triene-11,20-dione 21-acetate B₆₁: 3-ethoxy-6α-fluoro-11β,21-dihydroxy-16α,17α-isopropylidenedioxypregna-3,5-dien-20-one 21-acetate B₆₂: 3-methoxy-6α-fluoro-11β,21-dihydroxy-16α,17α-isopropylidenedioxypregna-1,3,5-trien-20-one 21-acetate B₆₃: 3-methoxy-6α,9α-difluoro-11β,17α,21-trihydroxypregna-1,3,5-trien-20-one 17,21-diacetate B₆₄: 3-methoxy-6α,9α-difluoro-17α,21-dihydroxypregna-1,3,5-triene-11,20-dione 21-acetate B₆₅: 3-ethoxy-17α-hydroxy-6-methylpregna-3,5-dien-20-one acetate B₆₆: 3-methoxy-11β,17α,21-trihydroxypregna-3,5-dien-20-one 21-acetate

EXAMPLE 1

9α-fluoro-11β,17α-dihydroxy-21-(17′β-acetoxyestra-3′,5′-dien-3′-yloxy)-16β-methylpregna-1,4-diene-3,20-dione 17-benzoate A solution of 2.1 g. of 9α-fluoro-11β,17α,21-trihydroxy-16β-methylpregna-1,4-diene-3,20-dione 17-benzoate ($A_1$) and 1.5 g. of 3-ethoxyestra-3,5-dien-17β-ol acetate ($B_1$) in 20 ml. of anhydrous dimethylformamide containing 40 mg. of pyridine tosylate, was maintained at 130° C. for a period of 90 minutes under nitrogen stream. After addition of some drops of pyridine, the solvent was removed under reduced pressure. The residue was taken up with ether and crystallized to give 2.1 g. of 9α-fluoro-11β,17α-dihydroxy - 21 - (17′β - acetoxyestra-3′,5′-dien-3′-yloxy)-16β-methylpregna-1,4-diene-3,20-dione 17-benzoate melting at 190–195° C. The product re-crystallized twice from methylene chloride-methanol, showed M.P. 198–201° C., $[α]_{D25°} = -29°$ (c.=1, dioxane).

By an analogous procedure, the following disteroidyl ethers were prepared:

TABLE I

| Ex. No. | Disteroidyl ethers | Prepared from— |
|---|---|---|
| 2 | 9α-fluoro-11β,17α-dihydroxy-21-(17′-oxoestra-3′,5′-dien-3′-yloxy)-16β-methylpregna-1,4-diene-3,20-dione 17-benzoate. | $A_1+B_2$ |
| 3 | 9α-fluoro-11β,17α-dihydroxy-21-(17′β-acetoxy-5′α-androsta-1′,3′-dien-3-yloxy)-16β-methylpregna-1,4-diene-3,20-dione 17-benzoate. | $A_1+B_3$ |
| 4 | 9α-fluoro-11β,17α-dihydroxy-21-(20′-oxopregna-3′,5′-dien-3′-yloxy)-16β-methylpregna-1,4-diene-3,20-dione 17-benzoate. | $A_1+B_4$ |
| 5 | 9α-fluoro-11β,17α-dihydroxy-21-(20′-oxo-19′-nor-pregna-3′,5′-dien-3′-yloxy)-16β-methylpregna-1,4-diene-3,20-dione 17-benzoate. | $A_1+B_5$ |
| 6 | 9α-fluoro-11β,17α-dihydroxy-21-(17′β-propionoxy-5′β-androst-3′-en-3′-yloxy)-16β-methylpregna-1,4-diene-3,20-dione 17-benzoate. | $A_1+B_6$ |
| 7 | 17α-hydroxy-21-(17β-propionoxyestra-3′,5′-dien-3′-yloxy)-pregna-1,4-diene-3,11,20,-trione 17-benzoate. | $A_5+B_6$ |
| 8 | 17α-hydroxy-21-(17′β-propionoxyandrosta-3′,5′-dien-3′-yloxy)-pregna-1,4-diene-3,11,20-trione 17-benzoate. | $A_5+B_7$ |
| 9 | 17α-hydroxy-21-(6′α,9′α-difluoro-17α-propionoxy-11β,20′-dioxopregna-1′,3′,5′-trien-3′loxy)-pregna-3,4-diene-3,11,20-trione 17-benzoate. | $A_5+B_{29}$ |
| 10 | 11β,17α-dihydroxy-21-(17′-oxoestra-3′,5′-dien-3-yloxy)-pregna-1,4-diene-3,20-dione 17-benzoate. | $A_2+B_2$ |
| 11 | 21-(20′-oxo-21′-acetoxypregna-3′,5′-dien-3′-yloxy)-pregn-4-ene-3,20-dione. | $A_3+B_8$ |
| 12 | 9α-fluoro-11β,17α-dihydroxy-21-(19′-nor-17′α-pregna-3′,5-diene-21′,17′-carbolactone-3′-yloxy)-16β-methylpregna-1,4-diene-3,20-dicne 17-benzoate. | $A_1+B_{32}$ |
| 13 | 9α-fluoro-11β,17α-dihydroxy-21-(7′α-acetylmercapto-17′α-pregna-3′,5′-diene-21′,17′-carbolactone-3′-yloxy)-16β-methylpregna-1,4-diene-3,20-dione 17-benzoate. | $A_1+B_{31}$ |
| 14 | 11β,17α-dihydroxy-21-(7′α-acetylmercapto-19′-nor-17′α-pregna-3′,5′-diene-21′,17′-carbolactone-3′-yloxy)-pregna-1,4-diene-3,20-dione 17-benzoate. | $A_2+B_{33}$ |
| 15 | 9α,11β-dichloro-17α-hydroxy-21-(11′β-methyl-17′β-acetoxy-19-nor-17′α-pregna-3′,5′-dien-20′-yn-3′-yloxy)-16β-methylpregna-1,4-diene-3,20-dione acetate. | $A_8+B_{34}$ |
| 16 | 11β,17α-dihydroxy-21-(11′β,17′α-dihydroxy-20′-oxo-21′-acetoxypregna-3′,5′-dien-3′-yloxy)-pregn-4-en-3,20-dione 17-benzoate. | $A_{18}+B_{66}$ |
| 17 | 9α,11β-dichloro-21-(17′β-acetoxy-19′-nor-pregna-3′,5′-dien-20′-yn-3′-yloxy)-17α-hydroxypregna-1,4-diene-3,20-dione benzoate. | $A_{19}+B_{37}$ |
| 18 | 9α,11β-dichloro-21-(17′α-acetoxy-20′-oxopregna-3′,5′-dien-3′-yloxy)-17α-hydroxypregna-1,4-diene-3,20-dione benzoate. | $A_{19}+B_{38}$ |
| 19 | 9α,11β-dichloro-17α-dihydroxy-21-(11′,20′-dioxo-17′α-hydroxy-21′-acetoxy-pregna-1′,3′,5′-trien-3′-yloxy)-16α-methylpregna-1,4-diene-3,20-dione 17-benzoate. | $A_{20}+B_{39}$ |
| 20 | 9α-fluoro-11β,17α-dihydroxy-21-(6′-chloro-17α-acetoxy-20′-oxopregna-3′,5′-dien-3′yloxy)-16α-methylpregna-1,4-diene-3,20-dione 17-benzoate. | $A_{20}+B_{40}$ |
| 21 | 9α-fluoro-11β,17α-dihydroxy-21-(17′β-acetoxy-17′α-methylestra-3′,5′-dien-3′-yloxy)-16α-methylpregna-1,4-diene-3,20-dione 17-benzoate. | $A_{20}+B_{41}$ |
| 22 | 9α-fluoro-11β,17α-dihydroxy-21-(9′α-fluoro-17′α-hydroxy-11′,20′-dioxo-21′-acetoxy-16′β-methyl pregna-1′,3′,5′-trien-3′-yloxy)-16β-methylpregna-1,4-diene-3,20-dione 17-benzoate. | $A_1+B_{42}$ |
| 23 | 9α-fluoro-11β,17α-dihydroxy-21-(17′α-hydroxy-11′,20′-dioxo-21′-acetoxypregna-3′,5′-dien-3′-yloxy)-16-methylenepregna-1,4-diene-3,20-dione 17-benzoate. | $A_{21}+B_{50}$ |
| 24 | 9α,11β-dichloro-21-(11′β,17′α-dihydroxy-20′-oxo-21′-acetoxypregna-1′,3′,5′-trien-3′-yloxy)-17α-hydroxypregna-1,4-diene-3,20-dione 17-benzoate. | $A_{19}+B_{51}$ |
| 25 | 9α,11β-dichloro-21-(9′α,11′β-dichloro-17′α-hydroxy-20′-oxo-21′-acetoxypregna-1′,3′,5′-trien-3′-yloxy)-17α-hydroxypregna-1,4-diene-3,20-dione 17-benzoate. | $A_{19}+B_{52}$ |
| 26 | 3β-hydroxy-21-(17′α,21′-diacetoxy-11′,20′-dioxo-pregna-1′,3′,5′-trien-3′-yloxy)-pregn-5-en-20-one 3-acetate. | $A_{14}+B_{46}$ |
| 27 | 9α,11β-dichloro-21-(9′α,11′β-dichloro-17′α-hydroxy-20′-oxo-21′-acetoxy-16′α-methylpregna-1′,3′,5′-trien-3′-yloxy)-17α-hydroxypregna-1,4-diene-3,20-dione 17-benzoate. | $A_{19}+B_{53}$ |
| 28 | 9α,11β-dichloro-21-(9′α,11′β-dichloro-17′α-hydroxy-20′-oxo-21′-acetoxy-16′-methylpregna-1′,3′,5′-trien-3′-yloxy)-17α-hydroxypregna-1,4-diene-3,20-dione 17-benzoate. | $A_{19}+B_{54}$ |

TABLE I

| Ex. No. | Disteroidyl ethers | Prepared from— |
|---|---|---|
| 29 | 9α-fluoro-11β,17α-dihydroxy-21-(9′α-fluoro-11′β,17′α-dihydroxy-20′-oxo-21′-acetoxy-16′α-methylpregna-1′,3′,5′-trien-3′-yloxy)-16α-methylpregna-1,4-dien-3,20-dione 17-benzcate. | A₂₀+B₅₅ |
| 30 | 9α-fluoro-11β,17α-dihydroxy-21-(9′α-fluoro-11′β-hydroxy-17′α-21′-diacetoxy-20′-oxo-16′β-methyl-pregna-1′,3′,5′-trien-3′-yloxy)-16α-methylpregna,1,4-diene-3,20-dione 17-benzoate. | A₂₀+B₅₇ |
| 31 | 9α-fluoro-11β,17α-dihydroxy-21-(9′α-fluoro-17′α,21′-diacetoxy-11′,20′-dioxo-16′α-methylpregna-1′,3′,5′-trien-3′-yloxy)-16α-methylpregna-1,4-diene-3,20-dione 17-benzoate. | A₂₀+B₅₆ |
| 32 | 9α-fluoro-11β,17α-dihydroxy-21-(9′α-fluoro-11′β,17′α-dihydroxy-20′-oxo-21′-acetoxy-16′-methylene-pregna-1′,3′,5′-trien-3′-yloxy)-16-methylene-pregna,1,4-diene-3,20-dione 17-benzoate. | A₂₁+B₅₈ |
| 33 | 6α,9α-difluoro-21-(6′α,9′α-difluoro-11′β-hydroxy-17′α-21′-diacetoxy-20′-oxopregna-1′,3′,5′-trien-3′-yloxy)-11β,17α-dihydroxypregna-1,4-dien-3,20-dione 17-benzoate. | A₂₂+B₆₃ |
| 34 | 6α,9α-difluoro-21-(6′α,9′α-difluoro-17′α-hydroxy-11′,20′-dioxo-21′-acetoxypregna-1′,3′,5′-trien-3′-yloxy)-17α-hydroxypregna-1,4-diene-3,11,20-trione 17-benzoate. | A₂₃+B₆₄ |
| 35 | 9α-fluoro-21-(9′α-fluoro-11′,20′-dioxo-17′α,21′-diacetoxy-16′-methylenepregna-1′,3′,5′-trien-3′-yloxy)-17α-hydroxy-16-methylenepregna-1,4-diene-3,11,20-trione 17-acetate. | A₂₆+B₅₉ |
| 36 | 21-(9′α-fluoro-16′α,17′α-isopropylidenedioxy-11′,20′-dioxo-21′-acetoxypregna-1′,3′,5′-trien-3′-yloxy)-17α-hydroxypregn-4-ene-3,20-dione 17-benzoate. | A₆+B₆₀ |
| 37 | 21-(6′α-fluoro-11′β-hydroxy-16′α,17′α-isopropyli-denedioxy-20′-oxo-21′-acetoxypregna-1′,3′,5′-trien-3′-yloxy)-17α-hydroxypregn-4-ene-3,20-dione 17-benzoate. | A₆+B₆₂ |
| 38 | 9α-fluoro-11β,17α-dihydroxy-21-(9′α-fluoro-11′β,17′α-dihydroxy-20′-oxo-21′-acetoxy-16′β-methyl pregna-1′,3′,5′-trien-3′-yloxy)-16β-methylpregna-1,4-diene-3,20-dione 17-benzoate. | A₁+B₁₄ |

The compounds described in the above examples are extremely active as anti-inflammatory agents.

9α-fluoro-11β,17α-dihydroxy-21-(17′β-acetoxy - estra-3′,5′-dien-3′-yloxy)-16β-methylpregna-1,4 - diene - 3,20-dione 17-benzoate (Ex. 1) and 9α-fluoro-11β,17α-dihydroxy-21-(17′-oxoestra-3′,5′-dien-3′-yloxy)-16β - methyl-pregna-1,4-diene-3,20-dione 17-benzoate (Ex. 2), were compared with the parent betamethasone in the granuloma-pouch assay and demonstrated an anti-exudative action at least 10 times higher than betamethasone. In the adrenalectomized animals survival was studied using a single dose administered subcutaneously: both of these compounds had an activity at least three times higher than that of the standard, betamethasone. The two aforementioned compounds also possessed, in comparison to betamethasone taken at the same dosage, a reduced toxicity and a reduced catabolic effect.

9α-fluoro-11β,17α-dihydroxy-21-(17′β-acetoxy-5′α-androsta-1′,3′-dien-3′-yloxy)-16β-methylpregna-1,4-diene-3,20-dione 17-benzoate (Ex. 3), 9α-fluoro-11β,17α-dihydroxy-21-(20′-oxo-19′-nor-pregna-3′,5′-dien-3′-yloxy)-16β-methylpregna-1,4-diene-3,20-dione 17-benzoate (Ex. 5), 9α-fluoro-11β,17α-dihydroxy-21-(20′-oxopregna-3′,5′-dien-3′-yloxy)-16β-methylpregna-1,4-diene-3,20-dione 17-benzoate (Ex. 4), and 9α-fluoro-11β,17α-dihydroxy-21-(17′β-propionoxy-5′β-androst-3′-en-3′-yloxy)-16β-methylpregna-1,4-diene-3,20-dione 17-benzoate (Ex. 6)

were found to be more active as local anti-inflammatory agents than the parent betamethasone, and in the granuloma-pouch assay, they displayed an anti-exudative activity at least 10 times higher than that of the standard.

11β,17α-dihydroxy-21-(17′-oxoestra-3′,5′-dien - 3′ - yl-oxy)-pregna-1,4-diene-3,20-dione 17-benzoate (Ex. 10) tested in the granuloma-pouch assay in comparison with the parent prednisolone, showed a prolonged anti-exudative action when administered orally, as well as a higher anti-inflammatory and thymolytic activity after a single oral treatment.

EXAMPLE 39

11β,17α-dihydroxy-21-(17′β-propionoxyandrosta-3′,5′-dien-3′-yloxy)-pregna-1,4-dien-3,20-dione 17-benzoate A solution consisting of 6 g. of 11β,17α,21-trihydroxy-pregna-1,4-diene-3,20-dione 17-benzoate (A₂) and 6 g. of 3-ethoxyandrosta-3,5-dien-17β-ol propionate (B₇) in 3000 ml. anhydrous benzene containing 100 mg. pyridine tosylate, was refluxed for 90 minutes until the volume of the solution was reduced to 200–300 ml. A few drops of pyridine were added and the solvent removed under vacuum. The residue was taken up with methanol to give by crystallization 5.95 g. of 11β,17α-dihydroxy-21-(17′β-propionoxyandrosta-3′,5′-dien-3′-yloxy)-pregna-1,4 - dien-3,20 - dione - 17 - benzoate melting at 217–220° C., $$[\alpha]^D_{25°} = -70.5°$$

(c.=0.5, dioxane).

By an analogous procedure the following disteroidyl ethers (Table II) were prepared:

TABLE II

| Ex. No. | Disteroidyl ethers | Prepared from— |
|---|---|---|
| 40 | 3β-hydroxy-21-(17′β-propionoxy-5β-androst-3′-en-3′-yloxy)-pregn-5-en-20-one 3-acetate. | A₁₄+B₆ |
| 41 | 11β-hydroxy-21-(17′β-valeroxy-19′-nor-17′α-pregna-3′,5′-dien-20′-yn-3′-yloxy)-pregn-4-en-3,20-dione. | A₁₅+B₂₃ |
| 42 | 3β-hydroxy-21-(13′-ethyl-17′β-acetoxy-17′α-ethynyl-gona-3′,5′-dien-3′-yloxy)-pregn-5-en-20-one 3-acetate | A₁₄+B₂₄ |
| 43 | 3β-hydroxy-21-(17′α-acetoxy-20′-oxo-6′-methyl-acetate. | A₁₄+B₂₅ |
| 44 | 11β-hydroxy-21-(17′-oxoandrosta-3′,5′-dien-3′-yloxy)-pregn-4-ene-3,20-dione. | A₁₅+B₂₆ |
| 45 | 21-(6′α,9′α-difluoro-11′,20′-dioxo-17′α,21′-diacetoxy-pregna-1′,3′,5′-trien-3′-yloxy)-pregn-4-ene-3,20-dione. | A₁₆+B₂₇ |
| 46 | 21-(6′α-fluoro-11′,20′-dioxo-21′-acetoxy-16′α-methyl-pregna-1′,3′,5′-trien-3′-yloxy)-5α-pregnane-3,20-dione. | A₉+B₃₅ |
| 47 | 21-(6′α-fluoro-11′β-hydroxy-20′-oxo-21′-acetoxy-16′α-methylpregna-1′,3′,5′-trien-3′-yloxy)-5α-pregnane-3,20-dione. | A₉+B₃₆ |
| 48 | 11β-hydroxy-21-(6′α,9′α-difluoro-11′β-hydroxy-17′α-propionoxy-20′-oxopregna-1′,3′,5′-trien-3′-yloxy)-pregn-4-ene-3,20-dione. | A₁₅+B₂₈ |
| 49 | 21-(6′α,9′α-difluoro-11′β-hydroxy-17′α-propionoxy-20′-oxopregna-1′,3′,5′-trien-3′-yloxy)-5α-pregnane-3,20-dione. | A₉+B₂₉ |
| 50 | 21-(21′,17′β-carbolactone-17′α-pregna-3′,5′-dien-3′-yloxy)-5α-pregnane-3,20-dione. | A₉+B₃₀ |
| 51 | 6α-fluoro-11β-hydroxy-21-(17′β-acetoxyandrosta-3′,5′-dien-3′-yloxy)-16α-methylpregna-1,4-diene-3,20-dione. | A₂₅+B₄₃ |
| 52 | 6α-fluoro-11β-hydroxy-21-(20′-oxo-21′-acetoxy-5′β-pregn-3′-en-3′yloxy)-16α-methylpregna-1,4-diene-3,20-dione. | A₂₅+B₄₄ |
| 53 | 21-(20′-oxo-21′-acetoxy-5′α-pregn-2′-en-3′-yloxy)-5α-pregnane-3,20-dione. | A₉+B₄₅ |
| 54 | 21-(20′-oxo-5′α-pregn-2′-en-3′-yloxy)-5α-pregnane-3,20-dione. | A₉+B₄₇ |
| 55 | 6α-fluoro-11β-hydroxy-21-(11′,20′-dioxo-5′β-pregn-3′-en-3′-yloxy)-16α-methylpregna-1,4-diene-3,20-dione. | A₂₅+B₄₈ |
| 56 | 6α-fluoro-11β-hydroxy-21-(11′,20′-dioxo-17′α-acetoxy-5′β-pregn-3′-en-3′-yloxy)-16α-methylpregna-1,4-diene-3,20-dione. | A₂₅+B₄₉ |
| 57 | 6α-fluoro-21-(6′α-fluoro-11′β-hydroxy-20′-oxo-21′-acetoxy-16′α-17′α-isopropylidenedioxypregna-3′,5′-dien-3′-yloxy)-16α-methylpregna-1,4-diene-3,11,20-trione. | A₂₄+B₆₁ |
| 58 | 21-(17′α-acetoxy-20′-oxo-6′-methylpregna-3′,5′-dien-3′-yloxy)-pregn-4-en-3,11,20-trione. | A₁₇+B₆₅ |
| 59 | 9α-fluoro-11β,17α-dihydroxy-21-(9′α-fluoro-11′β,17′α-dihydroxy-20′-oxo-21′-acetoxy-16′β-methyl-pregna-3′,5′-dien-3′-yloxy)-16β-methylpregna-1,4-diene-3,20-dione 17-benzoate. | A₁+B₁₁ |

11β,17α - dihydroxy - 21 - (17′β-propionoxyandrosta-3′,5′-dien-3′-yloxy)-pregna - 1,4 - diene - 3,20 - dione 17-benzoate (Ex. 39), when administered daily by the oral route demonstrated an activity 4 times as high as that of prednisolone in the agar granuloma test. The same compound, when administered in a single oral dose displayed a much higher anti-inflammatory and thymolytic activity than the parent prednisolone, in the agar granuloma test.

In the granuloma-pouch assay, 11β,17α-dihydroxy-21-(17′β-propionoxyandrosta - 3′5′ - dien-3′-yloxy)-pregna-1,4-diene-3,20-dione 17-benzoate (Ex. 39) (local administration) possessed an anti-exudative activity at least 30 times as high as that of the parent prednisolone, as well as a poor systemic action: protracted treatment with an orally administered dose, showed, in comparison to the standard evidence of clear anti-exudative action.

9α-fluoro - 11β,17α - dihydroxy - 21 - (9'α-fluoro-11'β,17'α-dihydroxy - 20' - oxo-21'-acetoxy-16'β-methylpregna-3',5'-dien-3'-yloxy) - 16β - methylpregna - 1,4-dien-3,20-dione 17-benzoate (Ex. 59) displayed upon local treatment using the granuloma-pouch assay, an anti-exudative action at least 10 times as high as that of the parent betamethasone.

EXAMPLE 60

17α,21-(17'β-propionoxy-5'α-androstane-3',3'-diyloxy)-pregna-1,4-diene-3,11,20-trione (two isomers)

A solution consisting of 5 mg. of 17α,21-dihydroxy-pregna-1,4-diene - 3,11,20 - trione ($A_4$) and 5 g. of 3,3-dimethoxy-5α-androstan-17β - ol propionate ($B_{12}$) in 3000 ml. of anhydrous benzene containing 100 mg. of pyridine tosylate was distilled for 90 minutes until the volume of the solution was reduced to 200–300 ml. A few drops of pyridine were added, the solvent removed under vacuum and by crystallization 6 g. of the product melting at 254–259°, $[\alpha]^D_{25°}=+80°$ (c.=1, dioxane) were obtained. Two crystallizations from methylene chloride:ethanol gave 3.5 g. of 17α,21-(17'β-propionoxy-5'α-androstane - 3',3' - diyloxy) - pregna-1,4-diene-3,11,20-trione (more dextro-rotatory isomer) melting at 282–284° C., $[\alpha]^D_{25°}=+102.5°$ (c.=1, dioxane). From the aqueous mother liquors, by fractionated crystallization, 500 mg. of less dextro-rotatory isomer, melting at 319–322° C., $[\alpha]^D_{25°}=+31.3°$ (c.=1, dioxane) were isolated.

Other disteroidyl acetals prepared by this procedure are listed in Table III.

TABLE III

| Ex. No. | Disteroidyl acetals | Prepared from— |
|---|---|---|
| 61 | 17α,21-(17'β-acetoxy-5'α-androstane-3',3'-diyloxy)-pregn-4-ene-3,11,20-trione. | $A_{10}+B_{13}$ |
| 62 | 17α,21-(20'-oxo-5'β-pregnane-3',3'-diyloxy)-pregna-1,4-diene-3,11,20-trione. | $A_4+B_{19}$ |
| 63 | 17α,21-(17'β-propionoxyandrost-5'-en-3',3'-diyloxy)-pregn-4-ene-3,20-dione. | $A_{11}+B_7$ |
| 64 | 17α,21-(20'-oxo-21'-acetoxy-5'α-pregnane-3',3'-diyloxy)-11β-acetoxypregna-1,4-diene-3,20-dione. | $A_7+B_{20}$ |
| 65 | 17α,21-(20'-oxo-21'-butyroxy-5'α-pregnane-3',3'-diyloxy)-9α-fluoro-11β-acetoxy-16β-methylpregna-1,4-dien-3,20-dione. | $A_{12}+B_{21}$ |
| 66 | 17α,21-(11',20'-dioxo-5'β-pregnane-3',3'-diyloxy)-9α-fluoro-11β-acetoxy-16α-methylpregna-1,4-dien-3,20-dione. | $A_{13}+B_{22}$ |
| 67 | 17α,21-(11'β,17'α-dihydroxy-20'-oxo-21'-acetoxypregn-5'-en-3',3'-diyloxy)-11β-hydroxypregna-1,4-diene-3,20-dione 11-acetate. | $A_7+B_{66}$ |
| 68 | 17α,21-(17'β-acetoxy-5'α-androstane-3',3'-diyloxy)-pregna-1,4-diene-3,11,20-trione. | $A_4+B_{13}$ |
| 69 | 17α,21-(17'β-acetoxy-5'α-androstane-3',3'-diyloxy)-11β-acetoxy-pregna-1,4-diene-3,20-dione. | $A_7+B_{13}$ |

EXAMPLE 70

9α - fluoro-11β,17α-dihydroxy-21- 17'β-hydroxyestra-3',5'-dien-3'-yloxy) - 16β-methylpregna-1,4-diene-3,20-dione 17-benzoate Grams 0.5 of 9α-fluoro-11β,17α-dihydroxy-21 - (17'-oxoestra-3',5'-dien-3'-yloxy) - 16β - methylpregna-1,4-diene-3,20-dione 17-benzoate (Ex. 2) dissolved in 40 ml. of tetrahydrofurane were added to a solution of 0.1 g. of sodium borohydride in 0.4 ml. water, externally cooled with an ice-water bath. The mixture was left for 75 minutes at room temperature under stirring. The solution was then evaporated under reduced pressure, poured into water and the precipitate filtered to give 0.35 g. of 9α-fluoro-11β,17α-dihydroxy-21-(17'β - hydroxyestra-3',5'-dien-3'-yloxy)-16β - methylpregna - 1,4 - diene-3,20-dione 17-benzoate melting at 205° C. (with decomposition). The product, recrystallized from methylene chloride:-methanol, showed M.P. 208° C. (with decomposition), $[\alpha]^D_{25°}=-22°$ (c.=0.5, dioxane).

This compound tested in the granuloma-pouch assay, after oral single administration, showed an anti-inflammatory activity almost five times as high as that of the parent betamethasone.

With analogous procedure, the following 17'β- or 20'β-hydroxydisteroidyl derivatives (Table IV) were prepared.

TABLE IV

| Ex. No. | Disteroidyl acetals | Prepared from end compound— |
|---|---|---|
| 71 | 11β,17α-dihydroxy-21-(17'β-hydroxyestra-3',5'-dien-3'-yloxy)-pregna-1,4-diene-3,20-dione 17-benzoate. | Ex. 10. |
| 72 | 9α-fluoro-11β,17α-dihydroxy-21-(20'β-hydroxy-19'-nor-pregna-3',5'-dien-3'-yloxy)-16β-methylpregna-1,4-diene-3,20-dione 17-benzoate. | Ex. 5. |
| 73 | 9α-fluoro-11β,17α-dihydroxy-21-(17'β-hydroxyestra-3',5'-dien-3'-yloxy)-16β-methylpregna-1,4-diene-3,20-dione 17-benzoate. | Ex. 2. |
| 74 | 9α-fluoro-11β,17α-dihydroxy-21-(20'β-hydroxypregna-3',5'-dien-3'-yloxy)-16β-methylpregna-1,4-diene-3,20-dione 17 benzoate. | Ex. 4. |
| 75 | 11β,17α-dihydroxy-21-(11'β,17'α,20'β-trihydroxy-21'-acetoxypregna-3',5'-dien-3'-yloxy)-pregn-4-en-3,20-dione 17-benzoate. | Ex. 16. |
| 76 | 21-(6'α,9'α-difluoro-11'β-hydroxy-17'α-propionoxy-20'-oxopregna-1',3',5'-trien-3'-yloxy)-5α-pregnane-3β,20β-diol. | Ex. 49. |
| 77 | 9α,11β-dichloro-21-(11'β,17'α,20'β-trihydroxy-21'-acetoxypregna-1',3',5'-trien-3'-yloxy)-17α-hydroxypregna-1,4-diene-3,20-dione 17-benzoate. | Ex. 24. |
| 78 | 9α,11β-dichloro-21-(9'α,11'β-dichloro-17'α,20'β-dihydroxy-21'-acetoxypregna-1',3',5'.trien-3'-yloxy)-17α-hydroxypregna-1,4-diene-3,20-dione 17-benzoate. | Ex. 25. |
| 79 | 9α,11β-dichloro-21-(9'α,11'β-dichloro-17'α,20'β-dihydroxy-21'-acetoxy-16'α-methylpregna-1',3',5'-trien-3'-yloxy)-17α-hydroxypregna-1,4-diene-3,20-dione 17-benzoate. | Ex. 28. |
| 80 | 9α-fluoro-11β,17α,dihydroxy-21-(9'α-fluoro-11'β,17'α,20'β-trihydroxy-21'-acetoxy-16'α-methylpregna-1',3',5'-trien-3'-yloxy)-16α-methylpregna-1,4-diene-3,20-dione 17-benzoate. | Ex. 29. |

EXAMPLE 81

11β,17α-dihydroxy-21-(17'β-propionoxyandrosta-3',5'-dien-3'-yloxy)-pregna-1,4-diene-3,20-dione A suspension consisting of 1 g. of 11β,17α-dihydroxy-21 - (17'β-propionoxyandrosta - 3',5'-dien-3'-yloxy) - pregna-1,4-diene-3,20-dione 17-benzoate (Ex. 39) in 15 ml. tetrahydrofurane and 60 ml. a 5% methanolic potassium hydroxide solution was stirred under nitrogen for three hours. The product solubilized after about 10 minutes. Then the solution was evaporated under reduced pressure, poured into water and the precipitate consisting of 11β,17α-dihydroxy-21-(17'β - hydroxyandrosta - 3',5'-dien-3'-yloxy)-pregna-1,4-diene-3,20-dione was collected by filtration. The product dissolved in 5 ml. anhydrous pyridine was treated with 2.5 ml. propionic anhydride. After one night standing at room temperature, the solution was poured into ice and the crystalline product consisting of 950 mg. 11β,17a-dihydroxy-21-(17'β-propionoxyandrosta-3',5'-dien-3'-yloxy)-pregna-1,4 - diene-3,20-dione was filtered. After two crystallizations from methylene chloride:methanol a product melting at 246–248° C., $[\alpha]^D_{25°}=+3°$ (c.=0.5, dioxane) was obtained.

With analogous procedure, 17α-hydroxy-21-(17'β-propionoxy - androsta - 3',5'-dien-3'-yloxy)-pregna-1,4-dien-3,11,20-trione, melting at 234–235° C. dec. was obtained from the corresponding 17-benzoate described in Ex. 8.

The propionic anhydride may be replaced in the procedure of this example by the anhydride of other mono- or dicarboxylic organic acids, including acetic, propionic, butyric, valeric, caproic, oenanthic, benzoic, malonic, phthalic, glutaric and succinic acids to give the corresponding esters of the desired disteroidyl compound.

EXAMPLE 82

17α,21-(17'β-hydroxy-5'α-androstane-3',3'-diyloxy)-11β-hydroxypregna-1,4-diene-3,20-dione A solution containing 6 g. of 17α,21-(17'β-acetoxy-5'α-androstane-3',3'-diyloxy)-11β-acetoxypregna - 1,4 - diene-3,20-dione (more dextro-rotatory isomer) (Ex. 69) in a 5% methanolic potassium hydroxide was refluxed for 45 minutes under nitrogen stream. The solvent was then removed under reduced pressure, the residue taken up with water and extracted with methylene chloride. By recrystallization from methylene chloride:ethyl ether, 4.8 g. of 17α,21-(17′β-hydroxy-5′α-androstane-3′,3′-diyloxy)-11β-hydroxypregna-1,4-diene-3,20-dione (more dextro-rotatory isomer) were obtained melting at 230–233° C., $[\alpha]^D_{25°}=+74.6°$ (c.=1, dioxane).

The less dextro-rotatory isomer of 17α,21-(17′β-hydroxy - 5′α-androstane-3′,3′-diyloxy)-11β-hydroxypregna-1,4-diene-3,20-dione showed M.P. 218–222° C. (dec.).

EXAMPLE 83

21-(20′-oxo-21′-hydroxypregna-3′,5′-dien-3′-yloxy)-pregn-4-en-3,20-dione

A solution of 1.80 g. of 21-(20′-oxo-21′-acetoxypregna-3′,5′-dien-3′-yloxy)pregn-4-ene-3,20 (Ex. 11) in 85 ml. of tetrahydrofurane and 90 ml. of methanol was kept under nitrogen and treated with 1.85 ml. of 1 M sodium methoxide methanolic solution. After stirring at room temperature for 20 minutes, the solvent was evaporated under reduced pressure and the residue taken up with water and filtered. A crystallization from methylene chloride:methanol gave 1.16 g. of crystals of 21-(20′-oxo-21′-hydroxypregna-3′,5′-dien-3′-yloxy)-pregn-4-en-3,20-dione melting at 236–238° C., $[\alpha]^D_{25°}=+44.7°$ (c.=0.5, dioxane).

With an analogous procedure, the following disteroidyl ethers (Table V) were prepared.

TABLE V

| Ex. No. | Disteroidyl ethers | Prepared from end compound— |
| --- | --- | --- |
| 84 | 21-(20′-oxo-21′-hydroxypregna-3′,5′-dien-3′-yloxy)-pregn-4-ene-3,20-dione. | Ex. 11. |
| 85 | 11β,17α-dihydroxy-21-(11β′,17′α-21′-trihydroxy-20′-oxopregna-3′,5′-dien-3′-yloxy)-pregn-4-en-3,20-dione. | Ex. 16. |
| 86 | 9α-fluoro-11β,17α-dihydroxy-21-(11′,20′-dioxo-17′α-21′-dihydroxypregna-1′,3′,5′-trien-3′-yloxy)-16α-methylpregna-1,4-diene-3,20-dione 17-benzoate. | Ex. 19. |
| 87 | 9α-fluoro-11β,17α-dihydroxy-21-(9′α-fluoro-17′α, 21′-dihydroxy-11′,20′-dioxo-16′β-methylpregna-1′,3′,5′-trien-3′-yloxy)-16β-methylpregna-1,4-diene-3,20-dione 17-benzoate. | Ex. 22. |
| 88 | 9α-fluoro-11β,17α-dihydroxy-21-(11′,20′-dioxo-21′-hydroxypregna-3′,5′-dien-3′-yloxy)-16-methylenepregna-1,4-diene-3,20-dione 17-benzoate. | Ex. 23. |
| 89 | 9α,11β-dichloro-21-(11′β,17′α,21′-trihydroxy-20′-oxopregna-1′,3′,5′-trien-3′-yloxy)-17α-hydroxypregna-1,4-dien-3,20-dione. | Ex. 24. |
| 90 | 9α,11β-dichloro-21-(9′α,11′β-dichloro-17′α,21′-dihydroxy-20′-oxo-16′α-methylpregna-1′,3′,5′-trien-3′-yloxy)-17α-hydroxypregna-1,4-diene-3,20-dione 17-benzoate. | Ex. 25. |
| 91 | 9α-fluoro-11β,17-dihydroxy-21-(9′α-fluoro-11′β, 17′α,21′-trihydroxy-20′-oxo-16′α-methylpregna-1′,3′,5′-trien-3′-yloxy)-16α-methylpregna-1,4-diene-3,20-dione 17-benzoate. | Ex. 30. |
| 92 | 9α-fluoro-11β,17α-dihydroxy-21-(9′α-fluoro-17′α, 21′-dihydroxy-11′,20′-dioxo-16′α-methylpregna-1′,3′,5′-trien-3′-yloxy)-16α-methylpregna-1,4-diene-3,20-dione 17-benzoate. | Ex. 31. |
| 93 | 6α,9α-difluoro-21-(6′α,9′α-difluoro-17′α,21′-dihydroxy-11′,20′-dioxopregna-1′,3′,5′-trien-3′-yloxy)-17α-hydroxypregna-1,4-diene-3,11,20-trione 17-benzoate. | Ex. 34. |
| 94 | 9α-fluoro-21-(9′α-fluoro-11′,20′-dioxo-17′α,21′-dihydroxy-16-methylenepregna-1′,3′,5′-trien-3′-yloxy)-17α-hydroxy-16-methylenepregna-1,4-diene-3,11,20-trione 17-acetate. | Ex. 35. |
| 95 | 9α-fluoro-11β,17α-dihydroxy-21-(9′α-fluoro-11′β,17′α,21′-trihydroxy-20′-oxo-16′β-methylpregna-1′,3′,5′-trien-3′-yloxy)-16β-methylpregna-1,4-diene-3,20-dione 17-benzoate. | Ex. 38. |

EXAMPLE 96

21-(20′-oxo-21′-hemisuccinoxypregna-3′,5′-dien-3′-yloxy)-pregn-4-ene-3,20-dione

A solution of 1.3 g. of 21-(20′-oxo-21′-hydroxypregna-3′,5′-dien-3′-yloxy)-pregn-4-ene-3,20-dione (Ex. 83) and 3.8 g. succinic anhydride in 50 ml. of pyridine was kept overnight at room temperature. The mixture was then poured into a saturated salt solution and extracted with ether. The organic layer was separated, dried over anhydrous sodium sulphate and the solvent removed under reduced pressure. The residue was crystallized from methylene chloride:methanol to give 890 mg. of 21-(20′-oxo-21′ - hemisuccinoxypregna - 3′,5′ - dien-3′-yloxy)-pregn-4-ene-3,20-dione melting at 120–125° C., $[\alpha]^D_{25°}=+73°$ (c.=0.5, dioxane).

The succinic anhydride may be replaced in the procedure of this example by the anhydride of other mono- or dicarboxylic organic acid, including acetic, propionic, phthalic and glutaric acids. Similarly, the compound of this example, 21-(20′-oxo-21′-hydroxypregna-3′,5′-dien-3′-yloxy)-pregn-4-ene-3,20-dione, may be replaced by any other disteroidyl compound (as prepared according to the foregoing examples) having a free hydroxyl group at the 17′β- or 21′-position in order to obtain the corresponding esters.

Representative hemi-esters are listed in Table VI.

TABLE VI

| Ex. No. | Disteroidyl ethers | Prepared from end compound— |
| --- | --- | --- |
| 97 | 21-(20′-oxo-21′-hemisuccinoxypregna-3′,5′,-dien-3′-yloxy)-pregn-4-ene-3,20-dione. | Ex. 84. |
| 98 | 11β,17α-dihydroxy-21-(11′β,17′α-dihydroxy-20′-oxo-21′-hemisuccinoxypregna-3′,5′-dien-3′-yloxy)-pregn-4-en-3,20-dione 17-benzoate. | Ex. 85. |
| 99 | 11β-hydroxy-21-(11′β,17′α,21′-trihydroxy-20′-oxopregna-3′,5′-dien-3′-yloxy)-17α-benzoxypregn-4-en-3,20-dione 21′-hemiphthalate. | Ex. 85. |
| 100 | 9α-fluoro-11β,17α-dihydroxy-21-(11′,20′-dioxo-17′α-hydroxy-21′-hemisuccinoxypregna-1′,3′,5′-trien-3′-yloxy)-16α-methylpregna-1,4-diene-3,20-dione 17-benzoate. | Ex. 86. |
| 101 | 9α-fluoro-11β,17α-dihydroxy-21-(9′α-fluoro-17′α-hydroxy-11′,20′-dioxo-21′-hemisuccinoxy-16′β-methylpregna-1′,3′,5′-trien-3′-yloxy)-16β-methylpregna-1,4-diene-3,20-dione 17-benzoate. | Ex. 87. |
| 102 | 9α-fluro-11β,17α-dihydroxy-21-(11′,20′-dioxo-21′-hemisuccinoxypregna-3′,5′-dien-3′-yloxy)-16-methylenepregna-1,4-diene-3,20-dione 17-benzoate. | Ex. 88. |
| 103 | 9α,11β-dichloro-21-(9′α,11β-dichloro-17′α,21′-dihydroxy-20′-oxo-16′α-methylpregna-1′,3′,5′-trien-3′-yloxy)-17α-benzoxypregna-1,4-diene-3,20-dione 21′-hemiphthalate. | Ex. 90. |
| 104 | 9α-fluoro-11β,17α-dihydroxy-21-(9′α-fluoro-17′α-hydroxy-11′,20′-dioxo-21′-hemisuccinoxy-16′α-methylpregna-1′,3′,5′-trien-3′-yloxy)-16α-methylpregna-1,4-diene-3,20-dione 17-benzoate. | Ex. 92. |
| 105 | 9α-fluoro-21-(9′α-fluoro-11′,20′-dioxo-17′α-hydroxy-21′-hemisuccinoxy-16′-methylenepregna-1′,3′,5′-trien-3′-yloxy)-17α-hydroxy-16-methyl-enepregna-1,4-diene-3,11,20-trione 17-acetate. | Ex. 94. |
| 106 | 9α-fluoro-11β-hydroxy-17α-benzoxy-21-(9′α-fluoro-11′β,17′α,21′-trihydroxy-20′-oxo-16′β-methylpregna-1′,3′,5′-trien-3′-yloxy)-16β-methylpregna-1,4-diene-3,20-dione 21′-hemiphthalate. | Ex. 95. |
| 107 | 9α-fluoro-11β,17α-dihydroxy-21-(20′β-hemisuccinoxypregna-3′,5′-dien-3′-yloxy)-16β-methylpregna-1,4-diene-3,20-dione 17-benzoate. | Ex. 74. |
| 108 | 9α-fluoro-11β,17α-dihydroxy-21-(20′β-hemisuccinoxy-19′-nor-pregna-3′,5′-dien-3′-yloxy)-16β-methylpregna-1,4-diene-3,20-dione 17-benzoate. | Ex. 72. |
| 109 | 17,21-(17′β-hemisuccinoxy-5′α-androstane-3′,3′-diyloxy)-11β-hydroxypregna-1,4-diene-3,20-dione. | Ex. 82. |

EXAMPLE 110

21-(20′-oxo-21′-hydroxypregna-3′,5′-dien-3′-yloxy)-pregn-4-ene-3,20-dione-21′-disodium phosphate To a solution of 0.1 ml. of redistilled phosphorus oxychloride in 5 ml. of pyridine was added at —25° C. with stirring a solution of 0.4 ml. of 21-(20′-oxo-21′-hydroxypregna-3′,5′-dien-3′-yloxy)-pregn-4-ene - 3,20 - dione (Ex. 84) in 5 ml. of anhydrous pyridine. To the dichloride thus formed 20 ml. of water were added at such a rate that the reaction temperature did not exceed —10° C. The mixture was then allowed to stand at room temperature for 10 minutes and the pyridine removed under vacuo. The residue was taken up with water, and a sodium bicarbonate solution was carefully added until the mixture reached pH 7. After extraction with chloroform, the aqueous phase was evaporated to dryness in a vacuum. The residue was dissolved in methanol and the desired 21-(20′-oxo-21′-hydroxy-pregna-3′,5′-dien-3′-yloxy)-pregn - 4 - ene-3,20-dione 21′-disodium phosphate was obtained in the form of a white precipitate by addition of 1:1 mixture of anhydrous ether and absolute ethanol.

The following compounds were prepared in a similar manner:

9α-fluoro-11β-hydroxy-17α-benzoxy-21-(11′,20′-dioxo-17′α,21′-dihydroxypregna-1′,3′,5′-trien-3′-yloxy)-16α-methylpregna-1,4-diene-3,20-dione 21′-disodium phosphate; and 9α-fluoro-11β-hydroxy-17α-benzoxy-21-(11',20'-dioxo-21-hydroxypregna-3',5'-dien-3'-yloxy)-16-methylene-pregna-1,4-diene-3,20-dione 21'-disodium phosphate.

EXAMPLE 111

By the procedure of Example 1, 17α-hydroxy-21-(17'β-acetoxy - 19' - nor-17'α-pregna-3',5'-dien-20'-yn-3'-yloxy)-pregn-4-en-3,20-dione benzoate (melting point 172–174° C.) was prepared by the reaction of 17α,21-dihydroxy-pregn-4-ene-3,20-dione 17-benzoate ($A_6$) with 3-ethoxy-19-nor-17α-pregna-3,5-dien-20-yn-17β-ol acetate ($B_{10}$).

We claim:

1. Disteroidyl ethers having the structure:

wherein the broken line indicates the presence of a double bond between the carbon atoms in position 2':3' or 3':4'; St is a steroid moiety belonging to the pregnane series and St' is a steroid moiety belonging to the androstane or pregnane series or a corresponding 18-homo and 19-nor-derivative thereof.

2. The process for preparing disteroidyl ethers according to claim 1 which comprises the step of reacting a 21-hydroxysteroid of the pregnane series, having no free hydroxyl groups at the 16- and 17-positions, with the 3 enol ether or acetal of a 3-ketosteroid of the androstane or pregnane series and their 18-homo and 19-nor-derivatives having no free hydroxy groups at the 17β- or 21-positions, said reaction being carried out in an organic solvent under anhydrous conditions and in the presence of an acid catalyst at a temperature above 70° C.

3. A process for preparing disteroidyl acetals of the pregnane series which comprises the step of reacting a 17,21-dihydroxy steroid of the pregnane series with the 3-enolether or acetal of a 3-ketosteroid of the androstane or pregnane series, having no free hydroxyl groups at the 17β- or 21-positions, in an organic solvent under anhydrous conditions and in the presence of an acid catalyst at a temperature above 70° C.

4. Disteroidyl ethers of formula:

wherein
the hydrogen atom, if present in 5 and 5' positions, may have an α or β configuration;
$R_1$ represents a ketonic oxygen or a β-hydroxy group, free or esterified with an hydrocarbon carboxylic acid radical containing up to 8 carbon atoms;
R' represents hydrogen or methyl;
R" represents methyl or ethyl;

$R_2$ represents hydrogen, a ketonic oxygen, a β-hydroxy group optionally esterified with a lower alkanoic acid or a chlorine atom when also Y represents a chlorine;
$R_{2'}$ represents hydrogen, a ketonic oxygen, a β-methyl group, a β-hydroxy group optionally esterified with a lower alkanoic acid or a chlorine atom when also Y represents a chlorine;
$R_3$ and $R_{3'}$, each represents hydrogen, a methyl group, chloro or fluoro;
$R_4$ and $R_{4'}$, each represents hydrogen, a hydroxy group free or esterified with a lower alkanoic acid, an α- or β-methyl group or a methylene radical;
$R_5$ represents hydrogen, a hydroxy group or an acyloxy group containing up to 8 carbon atoms;
Y and Y', each represents hydrogen, chloro or fluoro;
the carbon atom at the $C_{17'}$ position having one of the following structures:

wherein A' represents hydrogen or an acyl radical containing up to 8 carbon atoms;
B' represents hydrogen or a saturated or unsaturated alkyl radical containing up to 4 carbon atoms;
Z' represents hydrogen, a hydroxy group or an acyloxy radical containing up to 8 carbon atoms;
$R_{5'}$ represents hydrogen, a hydroxy group or an acyloxy group containing up to 8 carbon atoms;
and wherein $R_4$ and $R_5$ or $R_{4'}$ and $R_{5'}$ may form together an isopropylidenedioxy radical of the structure the rings A and B optionally being saturated or optionally having one double bond in 1:2, 4:5 or 5:6 positions, or two double bonds in 1:2 and 4:5 positions, and the rings A' and B' having one of the following structures:

(a) (b) (c)

(d) (e)

5. Disteroidyl acetals of formula:

wherein
the hydrogen atom, if present in 5 and 5' positions, may have an α or β configuration;

R₂ represents hydrogen, a ketonic oxygen, a β-hydroxy group optionally esterified with a lower alkanoic acid or a chlorine atom when also Y represents a chlorine;

R₂' represents hydrogen, a ketonic oxygen, a β-methyl group, a β-hydroxy group optionally esterified with a lower alkanoic acid or a chlorine atom when also Y represents a chlorine;

R₄ and R₄' each represents hydrogen, a hydroxy group free or esterified with a lower alkanoic acid, an α- or β-methyl group or a methylene radical;

Y and Y', each represents hydrogen, chloro or fluoro;

the carbon atom at the $C_{17'}$ position having one of the following structures:

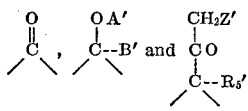

wherein A' represents hydrogen or an acyl radical containing up to 8 carbon atoms;

B' represents hydrogen or a saturated or unsaturated alkyl radical containing up to 4 carbon atoms;

Z' represents hydrogen, a hydroxy group or an acyloxy radical containing up to 8 carbon atoms;

R₅' represents hydrogen, a hydroxy group or an acyloxy group containing up to 8 carbon atoms;

the rings A and B optionally having one unsaturation between the carbon atoms in 1:2 or 4:5 positions or two unsaturations between the carbon atoms in 1:2 and 4:5 positions; and the rings A' and B' having one of the following structures:

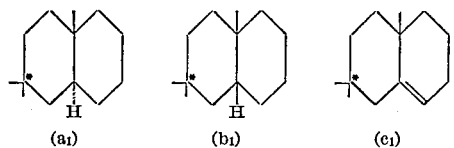

in which the carbon atom in 3'-position forms a new asymmetric center.

6. In the process for preparing disteroidyl ethers according to claim 4 the step which comprises reacting a 21-hydroxysteroid of the pregnane series of formula:

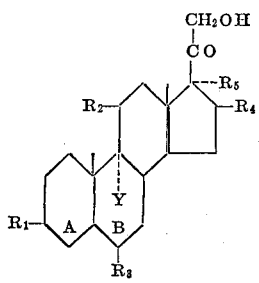

wherein the rings A and B and the substituents R₁, R₂, R₃, R₄, R₅ and Y are as defined in claim 4, with the exception that the hydroxyl groups, if present in 16- and 17-positions, are protected under the form of an ester, with an enolether or acetal of a 3-ketosteroid of formula:

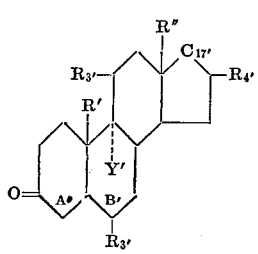

wherein the rings A' and B' optionally have one or two unsaturations and the substituents R', R", R₂', R₃', R₄', Y' and $C_{17'}$ are as defined in claim 4, with the exception that the hydroxyl groups, if present in the 17'β- or 21'-position, are protected under esterified form, said reaction being carried out in an organic solvent under anhydrous conditions and in the presence of an acid catalyst at a temperature above 70° C.

7. In the process for preparing disteroidyl acetals according to claim 5 the step which comprises reacting a 17,21-dihydroxy steroid of the pregnane series of formula:

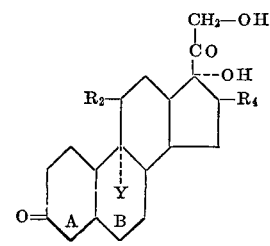

wherein the rings A and B and the substituents R₂, R₄ and Y are as defined in claim 5, with the enolether or acetal of a 3-ketosteroid of the androstane of pregnane series of formula:

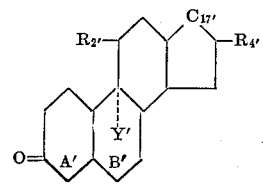

wherein the rings A' and B' are saturated or Δ⁴-unsaturated and the substituents R₂', R₄', Y' and the carbon atom at the $C_{17'}$ are as defined in claim 5, with the exception that the hydroxyl groups, if present in the 17'β- or 21'-position, are protected under esterified form, said reaction being carried out in an organic solvent under anhydrous conditions and in the presence of an acid catalyst at a temperature above 70° C.

8. A disteroidyl derivative according to claim 4 which is 9α-fluoro-11β,17α-dihydroxy-21-(17'β-acetoxy-estra-3', 5' - dien-3'-yloxy)-16β-methylpregna-1,4-diene-3,20-dione 17-benzoate.

9. A disteroidyl derivative according to claim 4 which is 9α-fluoro-11β,17-dihydroxy-21-(17'-oxoestra-3',5'-dien-3'-yloxy)-16β-methylpregna-1,4-diene-3,20-dione 17-benzoate.

10. A disteroidyl derivative according to claim 4 which is 11β,17α-dihydroxy - 21 - (17'-oxoestra-3',5'-dien-3'-yloxy)-pregna-1,4-diene-3,20-dione 17-benzoate.

11. A disteroidyl derivative according to claim 4 which is 11β,17α-dihydroxy-21-(17'β-propionoxyandrosta-3',5'-dien-3'-xyloxy)-pregna-1,4-diene-3,20-dione 17-benzoate.

12. A disteroidyl derivative according to claim 4 which is 9α - fluoro-11β,17α-dihydroxy-21-(9'α-fluoro-11'β,17'α-dihydroxy-20'-oxo-21'-acetoxy - 16'β - methylpregna-3',5'-dien-3'-yloxy)-16β-methylpregna-1,4-diene-3,20-dione 17-benzoate.

13. A disteroidyl derivative according to claim 4 which is 9α-fluoro-11β,17α-dihydroxy-21-(9'α-fluoro-17'α,21'-dihydroxy-11',20'-dioxo - 16'β - methylpregna-1',3',5'-trien-3'-yloxy)-16β-methylpregna-1,4-diene-3,20-dione 17-benzoate.

14. A disteroidyl derivative according to claim 4 which is 9α-fluoro - 11β,17α - dihydroxy-21-(9'α-fluoro-17'α-hydroxy - 11',20'-dioxo-21'-hemisuccinoxy-16'β-methylpregna-1',3',5'-trien-3'-yloxy) - 16β - methylpregna-1,4-diene-3,20-dione 17-benzoate.

15. A disteroidyl derivative according to claim 4 which is 9α-fluoro-11β,17α-dihydroxy-21-(17′β-hydroxyestra-3′,5′ - dien-3′-yloxy)-16β-methylpregna-1,4-diene-3,20-dione 17-benzoate.

16. A disteroidyl derivative according to claim 4 which is 11β,17α-dihydroxy - 21 - (11′β,17′α-dihydroxy-20′-oxo-21′-hemisuccinoxypregna - 3′,5′ - dien-3′-yloxy)-pregn-4-en-3,20-dione 17-benzoate.

17. A disteroidyl derivative according to claim 5 which is 17α,21-(17′β-hydroxy - 5′α - androstane-3′,3′-diyloxy)-11β-hydroxypregna-1,4-diene-3,20-dione.

18. A disteroidyl derivative according to claim 5 which is 17α,21-(17′β-propionoxy-5′α-androstane-3′,3′-diyloxy)-pregna-1,4-diene-3,11,20-trione.

References Cited
UNITED STATES PATENTS

| | | | |
|---|---|---|---|
| 3,766,223 | 10/1973 | Ercoli et al. | 260—397.1 |
| 3,347,878 | 10/1967 | Boswell | 260—397.3 |

ELBERT L. ROBERTS, Primary Examiner

U.S. Cl. X.R.

260—239.55 D, 397.45; 424—241

United STATES PATENT OFFICE
CERTIFICATE OF CORRECTION

Patent No. 3,842,075   Dated October 15, 1974

Inventor(s) Rinaldo Gardi and Romano Vitali

It is certified that error appears in the above-identified patent and that said Letters Patent are hereby corrected as shown below:

Column 2, line 48 "$C_{17}$" should read -- $C_{17'}$ --; line 57 "on" should read -- or --. Column 4, line 7 "valerate" should read -- valerates --; line 13 "sulphate" should read -- sulphates --. Column 5, line 39 "strickly" should read -- strictly --; line 48 "anolization" should read -- enolization --. Column 6, line 42 "diseroids" should read -- disteroids --; line 56 "-(17'β-propionoxyandrosa-3',5'-" should read -- -(17'β-propionoxyandrosta-3',5'- --; line 74 "-(17β-hydroxy-" should read -- -(17'β-hydroxy- --. Column 7, line 23 "signal" should read -- single --. Column 10, Table I, in the compound of Ex. 3 "3-yloxy" should read -- 3'-yloxy --; in the compound of Ex. 7 "17β-propionoxyestra-" should read -- 17'β-propionoxyestra- --; the compound of Ex. 9 "17α-hydroxy-21-(6'α,9'α-difluoro-17α-propionoxy-11β,20'-dioxopregna-1',3',5'-trien-3'loxy)-pregna-3,4-diene-3,11-20-trione 17-benzoate" should read

UNITED STATES PATENT OFFICE
CERTIFICATE OF CORRECTION

Patent No. 3,842,075      Dated October 15, 1974

Inventor(s) Rinaldo Gardi and Romano Vitali

It is certified that error appears in the above-identified patent and that said Letters Patent are hereby corrected as shown below:

-- 17α-hydroxy-21-(6'α,9'α-difluoro-17'-α-propionoxy-11'β,20'-dioxopregna-1',3',5'-trien-3'-yloxy)-pregna-1,4-diene-3,11,20-trione 17-benzoate --; in the compound of Ex. 10 "3-yloxy-" should read -- 3'-yloxy- --; in the compound of Ex. 12 "3',5-diene" should read -- 3',5'-diene --; in the compound of Ex. 20 "17α-acetoxy" should read -- 17'α-acetoxy --. Column 12, Table II, the compound of Ex. 43 "3β-hydroxy-21-(17'α-acetoxy-20'-oxo-6'-methyl-acetate" should read -- 3β-hydroxy-21-(17'α-acetoxy-20'-oxo-6'-methylpregna-3',5'-dien-3'-yloxy)-pregn-5-en-20-one-3-acetate --. Column 13, line 54 "17'β-hydroxyestra" should read -- (17'β-hydroxyestra --. Column 15, line 13 "pregna-4-ene-3,20" should read -- pregna-4-ene-3,20-dione --. Column 16, line 3 after "propionic," insert -- butyric, valeric, oenanthic, caproic, benzoic, malonic, --; Table VI, in the compound of Ex. 102, "9α-fluro-" should read -- 9α-fluoro- --;

UNITED STATES PATENT OFFICE
CERTIFICATE OF CORRECTION

Patent No. 3,842,075  Dated October 15, 1974

Inventor(s) Rinaldo Gardi and Romano Vitali

It is certified that error appears in the above-identified patent and that said Letters Patent are hereby corrected as shown below:

in the compound of Ex. 103, "$9\alpha\text{-}11\beta\text{-dichloro-}$" should read -- $9'\alpha\text{-}11'\beta\text{-dichloro-}$ --. Column 19, lines 67-68, that portion of the formula reading

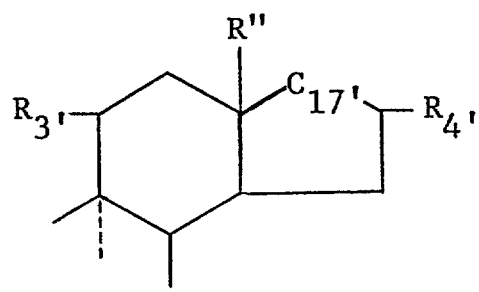

should read

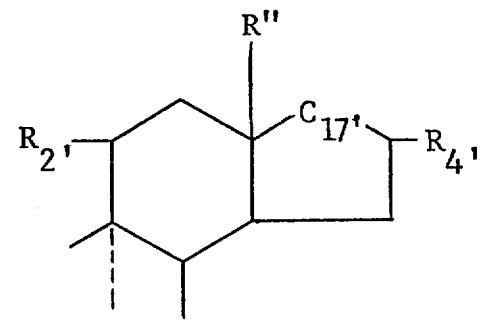

Column 20, line 60, "-3'-xyloxy" should read -- -3'-yloxy --.

Signed and Sealed this second Day of September 1975

[SEAL]

Attest:

RUTH C. MASON
Attesting Officer

C. MARSHALL DANN
Commissioner of Patents and Trademarks